US008190714B2

(12) United States Patent  (10) Patent No.: US 8,190,714 B2
Davidson et al.  (45) Date of Patent: May 29, 2012

(54) SYSTEM AND METHOD FOR COMPUTER CLUSTER VIRTUALIZATION USING DYNAMIC BOOT IMAGES AND VIRTUAL DISK

(75) Inventors: Shannon V. Davidson, Hillsboro, MO (US); Robert J. Peterson, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 1028 days.

(21) Appl. No.: 10/825,345

(22) Filed: Apr. 15, 2004

(65) Prior Publication Data

US 2005/0234846 A1  Oct. 20, 2005

(51) Int. Cl.
*G06F 15/177* (2006.01)
(52) U.S. Cl. ........ 709/220; 709/218; 709/221; 709/222; 707/999.001; 707/1
(58) Field of Classification Search .................. 709/218, 709/220, 221, 222; 707/999.001, 1
See application file for complete search history.

(56) References Cited

U.S. PATENT DOCUMENTS

| | | | |
|---|---|---|---|
| 4,868,818 A | 9/1989 | Madan | 371/11.3 |
| 4,885,770 A * | 12/1989 | Croll | 379/269 |
| 5,020,059 A | 5/1991 | Gorin et al. | 371/11.3 |
| 5,280,607 A | 1/1994 | Bruck et al. | |
| 5,301,104 A | 4/1994 | Yalamanchili | 395/800 |
| 5,450,578 A | 9/1995 | Mackenthun | |
| 5,513,313 A | 4/1996 | Bruck et al. | |
| 5,603,044 A | 2/1997 | Annapareddy et al. | |
| 5,682,491 A | 10/1997 | Pechanek et al. | |
| 5,748,872 A | 5/1998 | Norman | |
| 5,748,882 A | 5/1998 | Huang | 395/184.01 |
| 5,781,715 A | 7/1998 | Sheu | |
| 5,805,785 A | 9/1998 | Dias et al. | |
| 5,872,928 A * | 2/1999 | Lewis et al. | 709/222 |
| 5,889,953 A * | 3/1999 | Thebaut et al. | 709/221 |
| 5,926,619 A | 7/1999 | Badovinatz et al. | 395/182.02 |
| 5,933,631 A * | 8/1999 | Mealey et al. | 713/2 |
| 5,991,877 A * | 11/1999 | Luckenbaugh | 726/1 |
| 6,006,242 A * | 12/1999 | Poole et al. | 715/209 |
| 6,029,246 A * | 2/2000 | Bahr | 726/4 |
| 6,088,330 A | 7/2000 | Bruck et al. | |
| 6,158,010 A * | 12/2000 | Moriconi et al. | 726/1 |

(Continued)

FOREIGN PATENT DOCUMENTS

EP  0 981 089 A2  2/2000

(Continued)

OTHER PUBLICATIONS

Communication from the European Patent Office, European Search Report for Application No. EP 05 25 2235, 3 pages, Jul. 22, 2005, 3 pages.

(Continued)

*Primary Examiner* — John Follansbee
*Assistant Examiner* — Saket K Daftuar
(74) *Attorney, Agent, or Firm* — Cantor Colburn LLP

(57) ABSTRACT

A method for computer cluster virtualization includes selecting a distributed application. A policy associated with the distributed application is retrieved. One of a plurality of nodes is dynamically selected. Then, a boot image of the selected node is reset based, at least in part, on the retrieved policy, with the boot image being compatible with the distributed application. Then, a virtual disk image is associated with the node. At least a portion of the distributed application is then executed on the reset node using the associated virtual disk image.

42 Claims, 2 Drawing Sheets

U.S. PATENT DOCUMENTS

| | | | |
|---|---|---|---|
| 6,167,502 A | 12/2000 | Pechanek et al. | |
| 6,189,100 B1* | 2/2001 | Barr et al. | 713/182 |
| 6,230,252 B1 | 5/2001 | Passint et al. | |
| 6,393,581 B1 | 5/2002 | Friedman | |
| 6,408,326 B1* | 6/2002 | Larsson et al. | 709/201 |
| 6,415,323 B1 | 7/2002 | McCanne et al. | |
| 6,453,426 B1 | 9/2002 | Gamache et al. | 714/4 |
| 6,460,149 B1 | 10/2002 | Rowlands et al. | |
| 6,477,663 B1 | 11/2002 | Laranjeira et al. | |
| 6,480,972 B1 | 11/2002 | Cromer | |
| 6,496,941 B1 | 12/2002 | Segal et al. | |
| 6,597,956 B1* | 7/2003 | Aziz et al. | 700/3 |
| 6,629,266 B1 | 9/2003 | Harper et al. | 714/38 |
| 6,633,945 B1 | 10/2003 | Fu et al. | 710/316 |
| 6,658,504 B1 | 12/2003 | Lieber | |
| 6,675,264 B2 | 1/2004 | Chen et al. | 711/141 |
| 6,683,696 B1* | 1/2004 | Urie et al. | 358/1.15 |
| 6,691,165 B1 | 2/2004 | Bruck et al. | 709/227 |
| 6,718,486 B1 | 4/2004 | Rosellin et al. | |
| 6,735,660 B1 | 5/2004 | Osten et al. | |
| 6,748,737 B2 | 6/2004 | Mankude et al. | |
| 6,820,221 B2 | 11/2004 | Fleming | |
| 6,853,388 B2* | 2/2005 | Ueno et al. | 715/736 |
| 6,918,051 B2 | 7/2005 | Block et al. | |
| 6,918,063 B2 | 7/2005 | Ho et al. | |
| 6,922,791 B2 | 7/2005 | Mashayekhi et al. | |
| 6,950,818 B2* | 9/2005 | Dennis et al. | 1/1 |
| 6,950,833 B2 | 9/2005 | Costello et al. | 707/201 |
| 6,952,766 B2 | 10/2005 | Dervin et al. | |
| 7,016,299 B2 | 3/2006 | Kashyan | |
| 7,028,228 B1 | 4/2006 | Lovy et al. | |
| 7,032,119 B2* | 4/2006 | Fung | 713/320 |
| 7,043,539 B1* | 5/2006 | Treiber et al. | 709/220 |
| 7,046,687 B1 | 5/2006 | Brown et al. | 370/412 |
| 7,055,148 B2* | 5/2006 | Marsh et al. | 717/172 |
| 7,065,764 B1 | 6/2006 | Prael et al. | 718/102 |
| 7,073,053 B1* | 7/2006 | Oz et al. | 713/2 |
| 7,093,004 B2 | 8/2006 | Bernardin et al. | |
| 7,107,337 B2 | 9/2006 | Barrow et al. | 709/224 |
| 7,127,597 B2* | 10/2006 | Backman et al. | 713/1 |
| 7,155,512 B2 | 12/2006 | Lean et al. | |
| 7,207,039 B2* | 4/2007 | Komarla et al. | 717/178 |
| 7,231,430 B2* | 6/2007 | Brownell et al. | 709/218 |
| 7,237,129 B2* | 6/2007 | Fung | 713/323 |
| 7,287,179 B2 | 10/2007 | Doyle et al. | |
| 7,299,377 B2 | 11/2007 | Norman | |
| 7,379,983 B2* | 5/2008 | Zaharias | 709/220 |
| 7,428,583 B1* | 9/2008 | Lortz et al. | 709/223 |
| 7,433,931 B2 | 10/2008 | Richoux | 709/217 |
| 7,644,153 B2 | 1/2010 | Talwar et al. | 709/224 |
| 7,685,597 B1* | 3/2010 | Czajkowski et al. | 718/100 |
| 2001/0049740 A1 | 12/2001 | Karpoff | |
| 2002/0002613 A1 | 1/2002 | Freeman et al. | 709/225 |
| 2002/0059427 A1 | 5/2002 | Tamaki et al. | 709/226 |
| 2002/0062454 A1* | 5/2002 | Fung | 713/300 |
| 2003/0005039 A1 | 1/2003 | Craddock et al. | 709/203 |
| 2003/0005276 A1 | 1/2003 | French et al. | 713/2 |
| 2003/0009551 A1 | 1/2003 | Benfield et al. | |
| 2003/0046529 A1* | 3/2003 | Loison et al. | 713/2 |
| 2003/0084100 A1 | 5/2003 | Gahan et al. | 709/203 |
| 2003/0097487 A1 | 5/2003 | Rietze et al. | 709/325 |
| 2003/0135621 A1 | 7/2003 | Romagnoli | |
| 2003/0154112 A1 | 8/2003 | Neiman et al. | 705/5 |
| 2003/0188071 A1 | 10/2003 | Kunjan et al. | |
| 2003/0191795 A1 | 10/2003 | Bernardin et al. | 709/105 |
| 2003/0217105 A1 | 11/2003 | Zircher et al. | |
| 2003/0223361 A1 | 12/2003 | Hussain et al. | 370/230 |
| 2003/0237018 A1 | 12/2003 | Baba | 714/4 |
| 2004/0024949 A1 | 2/2004 | Winkler et al. | |
| 2004/0034794 A1* | 2/2004 | Mayer et al. | 713/200 |
| 2004/0054780 A1 | 3/2004 | Romero | 709/226 |
| 2004/0103218 A1 | 5/2004 | Blumrich et al. | |
| 2004/0186920 A1 | 9/2004 | Birdwell et al. | 710/1 |
| 2004/0210656 A1 | 10/2004 | Beck et al. | 709/225 |
| 2004/0268000 A1 | 12/2004 | Barker et al. | |
| 2005/0015384 A1 | 1/2005 | Wehrman et al. | 707/100 |
| 2005/0071843 A1 | 3/2005 | Guo et al. | |
| 2005/0149924 A1* | 7/2005 | Komarla et al. | 717/176 |
| 2005/0198200 A1 | 9/2005 | Subramanian et al. | 709/218 |
| 2005/0234846 A1 | 10/2005 | Davidson et al. | |
| 2005/0235055 A1 | 10/2005 | Davidson | |
| 2005/0235092 A1 | 10/2005 | Ballew et al. | |
| 2005/0235286 A1 | 10/2005 | Davidson | |
| 2005/0246569 A1 | 11/2005 | Ballew et al. | 714/4 |
| 2005/0251567 A1 | 11/2005 | Ballew et al. | |
| 2005/0256942 A1 | 11/2005 | McCardle et al. | |
| 2006/0106931 A1 | 5/2006 | Richoux | |
| 2006/0112297 A1 | 5/2006 | Davidson | |
| 2006/0117208 A1 | 6/2006 | Davidson | |
| 2006/0195508 A1 | 8/2006 | Bernardin et al. | 709/203 |
| 2007/0067435 A1 | 3/2007 | Landis et al. | 709/224 |
| 2009/0031316 A1 | 1/2009 | Richoux | 718/102 |

FOREIGN PATENT DOCUMENTS

| | | |
|---|---|---|
| JP | 05-274178 | 10/1993 |
| JP | 7200496 | 8/1995 |
| JP | 8227356 | 9/1996 |
| JP | 10-116261 | 6/1998 |
| JP | 10-222475 | 8/1998 |
| JP | 2002-024192 | 1/2002 |
| JP | 2002-108839 | 4/2002 |
| JP | 2003-099412 | 4/2003 |
| JP | 2004-110791 | 4/2004 |
| JP | 2007141305 | 6/2007 |
| KR | 2001-0000624 | 1/2001 |
| WO | WO 02/084509 | 10/2002 |
| WO | WO 02/095580 A1 | 11/2002 |
| WO | WO 03/005192 | 1/2003 |
| WO | WO 03/005292 A1 | 1/2003 |
| WO | WO 2005/106696 A1 | 11/2005 |

OTHER PUBLICATIONS

Rzymianowicz et al., "Clustering SMP Nodes with the ATOLL Network: A Look into the Future of System Area Networks," Proceedings of High Performance Computing, 8th International Conference, May 8, 2000, 10 pages.

Bhanot et al., "The BlueGene/L Supercomputer," 20th International Symposium on Lattice Field Theory, vol. 119, Jun. 2002, 8 pages.

Advanced Micro Devices et al., "Hypertransport Technology I/O Link—A High-Bandwidth I/O Architecture," Jul. 20, 2001, pp. 1-25.

Pinkston et al., "InfiniBand: The "De Facto" Future Standard for System and Local Area Networks or Just a Scalable Replacement for PCI Buses?," Cluster Computing-Kluwer Academic Publishers, vol. 6, No. 2, 2003.

Culler et al., "Parallel Computer Architecture—A Hardware/Software Approach, Interconnection Network Design," Morgan Kaufmann, 1999, 30 pages.

Communication from the European Patent Office, European Search Report for Application No. PCT/US2005/012031, 6 pages, Aug. 1, 2005 and Written Opinion of the International Search Authority, 5 pages.

Chang et al., "Performance Improvement of Allocation Schemes for Mesh-Connected Computers," Journal of Parallel and Distributed Computing, Academic Press, Duluth, MN, vol. 52, No. 1, Jul. 10, 1998, 30 pages.

Wanqian, et al. "Non-Contiguous Processor Allocation Algorithms for Distributed Memory Multicomputers," Supercomputing '94, Proceedings, Washington, D.C., Nov. 14-18, 1994, 10 pages.

Krevat et al., "Job Scheduling for the BlueGene/L System," Lecture Notes in Computer Science, vol. 2537, Jul. 24, 2002, 18 pages.

Communication from the European Patent Office, European Search Report for Application No. PCT/US2005/012313, 7 pages, Sep. 20, 2005, and Written Opinion of the International Search Authority, 7 pages.

Communication from the European Patent Office, European Search Report for Application No. PCT/US2005/012316, 7 pages, Sep. 14, 2005, and Written Opinion of the International Search Authority, 7 pages.

Communication from the European Patent Office, European Search Report for Application No. PCT/US2005/012242, 7 pages, Sep. 19, 2005, and Written Opinion of the International Search Authority, 9 pages.

Davidson, U.S. Appl. No. 10/991,754, filed Nov. 17, 2004, entitled Fault Tolerance and Recovery in a High-Performance Computing (HPC) System, 117 pages.
Communication from the European Patent Office, European Search Report for Application No. PCT/US2005/012314, 6 pages, Sep. 20, 2005, and Written Opinion of the International Search Authority, 7 pages, Mailed Feb. 10, 2006.
Feitelson, "Job Scheduling in Multiprogrammed Parallel Systems", IBM Research Report, Aug. 1997, pp. 1-4, XP002942107.
Kandlur et al., "Hypercube Management in the Presence of Node Failures", third conference on hypercube concurrent computers and applications ACM New York, 1988, pp. 328-336, vol. 1, XP002364194, 1998.
Wenjian et al., "Efficient Processor Allocation for 3D Tori", Parallel Processing Symposium 1995, Proceedings, 9th International, Apr. 25-28, 1995, IEEE Comput. Soc., pp. 466-471, XP010135921.
Ma et al., E-Kernel: An Embedding Kernel on the IBM Victor V256, Multiprocessor for Program Mapping and Network Reconfiguration, IEEE Transactions on Parallel and Distributed Systems, IEEE Service Center, vol. 5, No. 9, Sep. 1, 1994, pp. 977-994, XP000460490.
Communication from the European Patent Office, European Search Report for Application No. PCT/US2005/012643, 6 pages, Apr. 19, 2006, and Written Opinion of the International Search Authority, 5 pages.
Haynes et al., "A Visualization Tool for Analyzing Cluster Performance Data," 42nd Annual Symposium on Foundations of Computer Science, (FOCS 2001), Oct. 8, 2001, pp. 295-302, Oct. 14-17, 2001.
Patel et al., "Sage: An Application Development Tool Suite for High Performance Computing Systems," Aerospace Conference Proceedings, 2000, IEEE, vol. 11, pp. 491-500, Mar. 18-25, 2000.
Baraglia et al, "RsdEditor: A Graphical User Interface for Specifying Metacomputer Components," Heterogeneous Computing Workshop Proceedings, 9th Cancun, Mexico, pp. 336-345, May 1, 2000.
Wong, William, "Switch-Chip Fuels Third-Generation InfiniBand," Nov. 10, 2003, Electronic Design, 2 pages.
Communication from the European Patent Office, European Search Report for Application No. PCT/US2005/012500 and Written Opinion of the International Search Authority, mailed Aug. 1, 2005, 12 pages.
Communication from the European Patent Office, European Search Report for Application No. PCT/US2005/012489 and Written Opinion of the International Search Authority, mailed Nov. 18, 2005, 14 pages.
Unknown, "HP AlphaServer SC User Guide," Internet Article, Online!, Jul. 12, 2004, retrieved from the internet: URL:http://web1.quadrics.com/onlinedocs/AlphaServer/Eagle/html/AlphaServerUserGuide/ retrieved on Jul. 19, 2005, Jul. 12, 2004.
Choo et al., "An Efficient Submesh Allocation Scheme for 3D Torus Multicolor Systems," Parallel Algorithms/Architecture Synthesis, 1997, Proceedings, Second Aizu International Symposium Aizu-Wakamatsu, Japan, Mar. 17-21, 1997, Mar. 17, 1997-Mar. 21, 1997.
Unknown, "Message Passing Interface (MPI)," Internet Article, Online!, Dec. 23, 2003, pp. 1-33, retrieved from the internet: URL:http//web.archive.org/web/20040102194825/http://www.llnl.gov/computing/tutorial s/mpi/>, retrieved on Jul. 18, 2005, pages.
Panagiotis, Christias et al., "inetd—Internet Services Daemon," pp. 1-4, 1994 Man-cgi 1.15S, 1995 Modified for Solaris 2.3.
Unknown, "Cisco Local Director Configuration and Command Reference Guide," Internet Article, Online, Apr. 4, 2001.
Moore et al., "Managing Mixed-Use Clusters with Clusters-onDemand," Internet Article, Nov. 2002.
Di Santo et al., "Kernel Implementation of Locality-Aware Dispatching Techniques for Web Server Clusters," Cluster Computing, 2003 Proceedings, pp. 154-162, Dec. 1, 2003.
Ross et al., "3.3 Connectionless Transport," Feb. 22, 2001, pp. 1-4, retrieved on Nov. 1, 2005, Nov. 2, 2005.
Davidson et al., U.S. Appl. No. 10/825,345, entitled, *System and Method for Computer Cluster Virtualization Using Dynamic Boot Images and Virtual Disk*, 47 pages of specification, 10 pages of drawings, Apr. 15, 2004.
Davidson, U.S. Appl. No. 10/991,598, entitled, "*Scheduling in a High Performance Computing (HPC) System*", 111 pages specification, claims and abstract, 11 pages of drawings, Nov. 17, 2004.

Davidson, U.S. Appl. No. 10/991,994, entitled, "*On-Demand Instantiation in a High-Performance Computing (HPC) System*", 110 pages specification, claims and abstract, 12 pages of drawings, Nov. 17, 2004.
Ballew et al., U.S. Appl. No. 10/824,874, entitled, "*High Performance Computing System and Method*", 47 pages specification, claims and abstract, 10 pages of drawings, Apr. 15, 2004.
Ballew et al., U.S. Appl. No. 10/825,539, entitled, "*System and Method for Cluster Management Based on HPC Architecture*", 49 pages specification, claims and abstract, 10 pages of drawings, Apr. 15, 2004.
Ballew et al., U.S. Appl. No. 10/826,959, entitled, "*System and Method for Detecting and Managing HPC Node Failure*", 49 pages specification, claims and abstract, 10 pages of drawings, Apr. 15, 2004.
Davidson, U.S. Appl. No. 10/824,873, entitled, "*Graphical User Interface for Managing HPC Clusters*", 48 pages specification, claims and abstract, 10 pages of drawings, Apr. 15, 2004.
Ballew et al., U.S. Appl. No. 10/825,021, entitled, "*System and Method for Topology-aware Job Scheduling and Backfilling in an HPC Environment*", 49 pages specification, claims and abstract, 10 pages of drawings, Apr. 15, 2004.
Hans-Ulrich Heiss, "Processor Management in Two-Dimensional Grid-Architectures," Interner Bericht Nr. 20/92, XP002416087, 51 pages, Dec. 1992.
EPO Registered Letter, Application No. 05 252 239.8-1243, 6 pages, Feb. 2, 2007.
The Patent Office of the State Intellectual Property Office of the People's Republic of China, Office Action for Application No. 200510081719.3, 11 pages, Date of Dispatch Apr. 20, 2007.
Hovestadt et al., Scheduling in HPC Resource Management Systems: Queuing vs. Planning, Proceedings of the 9th Workshop on Job Scheduling Strategies for Parallel Processing, Seattle, WA, pp. 1-19, Jun. 2003.
Keller et al., "Anatomy of a Resource Management System for HPC Clusters," Annual Review of Scalable Computing, vol. 3, pp. 1-23, 2001.
Falck et al., Swedish Patent No. 102405, Application No. 102405, Aug. 26, 1941, 4 pages.
Nikkei Solution Business, "Most Up-to-Date Storage Solutions, Powerful for Substantial Cost Reduction in IT Systems," pp. 105-110, Sep. 2003.
Translated Japanese Patent Application No. 2003-531412, 4 pages, printed Jan. 4, 2008.
Translation of an Office Action, Japanese Patent Application No. 2005-117406, 6 pages.
Translation of an Office Action, Japanese Patent Application No. 2005-117403, 4 pages.
Translation of an Office Action, Japanese Patent Application No. 2005-117404, 7 pages.
Kimitaka et al., "Liquid Crystal Display Device," Abstracts of Japan for Publication No. 2005-241804, published Sep. 8, 2005, 2 pages.
Hidenori et al., "Magnetic Disk Drive," Abstracts of Japan for Publication No. 2007-141305, published Jun. 7, 2007, 2 pages.
Koichiro, "Semiconductor Storage Device and Its Test Method," Abstracts of Japan for Publication No. 2007-200496, published Aug. 9, 2007, 2 pages.
Translated Office Action for Korean Patent Application No. 10-2006-7023880, 8 pages.
Allen et al., "Title: The Cactus Worm: Experiments with Dynamic Resource Discovery and Allocation in a Grid Environment," 16 pages, Jan. 8, 2001.
Translated Office Action for Korean Patent Application No. 94111492, 6 pages.
Choo et al., "Processor Scheduling and Allocation for 3D Torus Multicomputer Systems", IEEE Transactions on Parallel and Distributed Systems, vol. 11, No. 5, May 2000, pp. 475-484.
USPTO; Office Action for U.S. Appl. No. 10/824,874, filed Apr. 15, 2004 in the name of James D. Ballew; 17 pages, Jun. 5, 2006.
USPTO; Office Action for U.S. Appl. No. 10/826,959, filed Apr. 15, 2004 in the name of James D. Ballew; 15 pages, Oct. 4, 2006.
USPTO; Office Action for U.S. Appl. No. 10/824,874, filed Apr. 15, 2004 in the name of James D. Ballew; 13 pages, Feb. 26, 2007.

*USPTO; Office Action* for U.S. Appl. No. 10/826,959, filed Apr. 15, 2004 in the name of James D. Ballew; 12 pages, Mar. 12, 2007.
*USPTO; Office Action* for U.S. Appl. No. 10/825,021, filed Apr. 15, 2004 in the name of Shannon V. Davidson; 9 pages, May 7, 2007.
*USPTO; Office Action* for U.S. Appl. No. 10/824,874, filed Apr. 15, 2004 in the name of James D. Ballew; 13 pages, Jul. 31, 2007.
*USPTO; Notice of Allowance and Fee(s) Due* for U.S. Appl. No. 10/991,598, filed Nov. 17, 2004 in the name of Anthony N. Richoux; 18 pages, Sep. 19, 2007.
*USPTO; Office Action* for U.S. Appl. No. 10/826,959, filed Apr. 15, 2004 in the name of James D. Ballew; 15 pages, Oct. 4, 2007.
*USPTO; Office Action for* U.S. Appl. No. 10/824,873, filed Apr. 15, 2004 in the name of Shannon V. Davidson; 10 pages, Dec. 4, 2007.
*USPTO; Office Action* for U.S. Appl. No. 10/825,539, filed Apr. 15, 2004 in the name of James D. Ballew; 18 pages, Jan. 10, 2008.
*USPTO; Notice of Allowance and Fee(s) Due* for U.S. Appl. No. 10/991,598, filed Nov. 17, 2004 in the name of Anthony N. Richoux; 17 pages, Jan. 22, 2008.
*USPTO; Office Action* for U.S. Appl. No. 10/826,959, filed Apr. 15, 2004 in the name of James D. Ballew; 17 pages, Jan. 29, 2008.
*USPTO; Office Action* for U.S. Appl. No. 10/825,021, filed Apr. 15, 2004 in the name of Shannon V. Davidson; 10 pages, Feb. 11, 2008.
*USPTO; Office Action* for U.S. Appl. No. 10/991,994, filed Nov. 17, 2004 in the name of Shannon V. Davidson; 16 pages, Mar. 20, 2008.
*USPTO; Office Action* for U.S. Appl. No. 10/991,754, filed Nov. 17, 2004 in the name of Shannon V. Davidson; 29 pages, Mar. 20, 2008.
*USPTO; Notice of Allowance and Fee(s) Due* for U.S. Appl. No. 10/991,598, filed Nov. 17, 2004 in the name of Anthony N. Richoux; 14 pages, Apr. 18, 2008.
*USPTO; Office Action* for U.S. Appl. No. 10/824,874, filed Apr. 15, 2004 in the name of James D. Ballew; 13 pages, Jul. 11, 2008.
*USPTO; Notice of Allowance and Fee(s) Due* for U.S. Appl. No. 10/991,754, filed Nov. 17, 2004 in the name of Shannon V. Davidson; 8 pages, Sep. 9, 2008.
*USPTO; Office Action* for U.S. Appl. No. 10/991,994, filed Nov. 17, 2004 in the name of Shannon V. Davidson; 16 pages, Sep. 12, 2008.
*USPTO; Office Action* for U.S. Appl. No. 10/826,959, filed Apr. 15, 2004 in the name of James D. Ballew; 17 pages, Oct. 20, 2008.
*Perbadanan Harta Intelek Malaysia; Office Action* for Application No. PI 20051531; 4 pages, Oct. 31, 2008.
*USPTO; Office Action* for U.S. Appl. No. 10/825,021, filed Apr. 15, 2004 in the name of Shannon V. Davidson; 9 pages, Oct. 31, 2008.
*USPTO; Office Action* for U.S. Appl. No. 10/825,539, filed Apr. 15, 2004 in the name of James D. Ballew; 16 pages, Nov. 13, 2008.
*USPTO; Office Action* for U.S. Appl. No. 10/824,873, filed Apr. 15, 2004 in the name of Shannon V. Davidson; 14 pages, Nov. 17, 2008.
*Canadian Intellectual Property Office; Office Action* for Application No. 2,503,775; 5 pages, Jan. 8, 2009.
*Canadian Intellectual Property Office; Office Action* for Application No. 2,503,781; 4 pages, Jan. 8, 2009.
*USPTO; Notice of Allowance and Fee(s) Due* for U.S. Appl. No. 10/826,959, filed Apr. 15, 2004 in the name of James D. Ballew; 5 pages, Feb. 11, 2009.
English Translation of the *Korean Notice of Final Rejection* for Application No. 10-2006-7023880; 5 pages, Feb. 25, 2009.
*USPTO; Advisory Action* for U.S. Appl. No. 10/824,873, filed Apr. 15, 2004 in the name of Shannon V. Davidson; 3 pages, Feb. 26, 2009.
*Perbadanan Harta Intelek Malaysia; Office Action* for Application No. PI 20051523; 3 pages, Mar. 6, 2009.
John P. Hayes, et al.; *Hypercube Supercomputers*; Proceedings of the IEEE; vol. 77, No. 12; XP-009113537; pp. 1829-1841, Dec. 1989.
Kurt Windisch, et al.; *ProcSimity: An Experimental Tool for Processor Allocation and Scheduling in Highly Parallel Systems*; XP-10130254; pp. 414-421, 1995.
Hee Yong Youn, et al.; *Dynamic Task Scheduling and Allocation for 3D Torus Multicomputer Systems*; 1996 International Conference on Parallel Processing; XP-9113574; pp. III-199-III-206.
Hsing-Lung Chen, et al.; *Distributed Submesh Determination in Faulty Tori and Meshes*; XP-10216762; pp. 65-70, 1997.
Geunmo Kim, et al.; *On Submesh Allocation for Mesh Multicomputers: A Best-Fit Allocation and a Virtual Submesh Allocation for Faulty Meshes*; IEEE Transactions on Parallel and Distributed Systems; vol. 9, No. 2; XP-000736328; pp. 175-185, Feb. 1998.

Moonsoo Kang, et al.; *Job-Based Queue Delay Modeling in a Space-Shared Hypercube*; XP-10356056; pp. 313-318, 1999.
*USPTO; Advisory Action* for U.S. Appl. No. 10/825,539, filed Apr. 15, 2004 in the name of James D. Ballew; 3 pages, Mar. 11, 2009.
*Euopean Patent Office Communication* for Application No. 07007897.7-2211; 12 pages, Mar. 19, 2009.
*USPTO; Office Action* for U.S. Appl. No. 10/991,994, filed Nov. 17, 2004 in the name of Shannon V. Davidson; 14 pages, Mar. 26, 2009.
The Intellectual Property Bureau Ministry of Economic Affairs, Office Action for Application No. 94111492, 2 pages.
Jiun-Sheng et al., "Network Topology Structure on Board of Computer Cluster," Publication No. TW532011B, Data Supplied from the esp@cenet database—Worldwide, 1 page.
*Canadian Intellectual Property Office; Office Action* for Application No. 2,503,773; 3 pages, Jun. 4, 2009.
*Intellectual Property Office of Singapore; Examination Report* for International Application No. 200607088-2; 7 pages, Apr. 13, 2009.
*USPTO; Office Action* for U.S. Appl. No. 10/825,021, filed Apr. 15, 2004 in the name of Shannon V. Davidson; 10 pages.
*USPTO; Office Action* for U.S. Appl. No. 10/824,874, filed Apr. 15, 2004 in the name of James D. Ballew; 3 pages, Apr. 28, 2009.
*USPTO; Notice of Allowance and Fee(s) Due* for U.S. Appl. No. 10/826,959, filed Apr. 15, 2004 in the name of James D. Ballew; 4 pages, May 12, 2009.
*Korean International Patent Office; Notice of Last Preliminary Rejection* for Application No. 10-2006-7023880; 5 pages, May 28, 2009.
*Korean International Patent Office; Notice of Last Preliminary Rejection English Translation* for Application No. 10-2006-07023880; 4 pages, May 28, 2009.
*USPTO; Office Action* for U.S. Appl. No. 10/824,873, filed Apr. 15, 2004 in the name of Shannon V. Davidson; 11 pages, Jun. 25, 2009.
*Japanese Patent Office; Translation of an Office Action* for Application No. 2005-117403; 1 page, Jun. 26, 2009.
*Japanese Patent Office; Translation of an Office Action* for Application No. 2005-117404; 1 page, Jun. 26, 2009.
*Japanese Patent Office; Translation of an Office Action* for Application No. 2005-117406; 1 page, Jun. 26, 2009.
*European Patent Office Communication Pursuant to Article 94(3) EPC* for Application No. 05 252 234.9-2211; 3 pages, Aug. 14, 2009.
*Cisco Systems; Cisco 12012 Gigabit Switch Router Switch Fabric Cards Replacement Instructions*; Doc. No. 78-4343-02; 14 pages, 2002.
*USPTO; Office Action* for U.S. Appl. No. 10/825,539, filed Apr. 15, 2004 in the name of James D. Ballew; 16 pages, Jun. 25, 2009.
*The Patent Office of the State Intellectual Property Office of the People's Republic of China; Decision on Rejection* for Application No. 200510087855.3; 7 pages, Jun. 26, 2009.
*USPTO; Advisory Action* for U.S. Appl. No. 10/825,021, filed Apr. 15, 2004 in the name of Shannon V. Davidson; 3 pages, Jul. 16, 2009.
*Translation of an Office Action of Japanese Patent Office* for Application No. 2007-508457; 3 pages, Aug. 12, 2009.
*European Patent Office; Communication Pursuant to Article 94(3) EPC* for Application No. 05 252 234.9-2211; 3 pages, Aug. 14, 2009.
*USPTO; Notice of Allowance and Fee(s) Due* for U.S. Appl. No. 10/826,959, filed Apr. 15, 2004 in the name of James D. Ballew; 6 pages, Aug. 28, 2009.
*USPTO; Office Action* for U.S. Appl. No. 10/824,874, filed Apr. 15, 2004 in the name of James D. Ballew; 5 pages, Sep. 4, 2009.
*European Patent Office; Communication Pursuant to Article 94(3) EPC* for Application No. 07007897.7-2211 / 1814029; 1 page, Sep. 18, 2009.
*Look up Tech Terms—Switching Fabric*; SearchStorage.com; http://search.techtarget.com; 4 pages, Retrieved Oct. 6, 2009.
*USPTO; Office Action* for U.S. Appl. No. 10/825,021, filed Apr. 15, 2004 in the name of Shannon V. Davidson; 12 pages, Oct. 15, 2009.
*USPTO; Office Action* for U.S. Appl. No. 10/991,994, filed Nov. 17, 2004 in the name of Shannon V. Davidson; 14 pages, Oct. 15, 2009.
*European Patent Office; Communication Pursuant to Article 94(3) EPC* for Application No. 05 737 440.7-1244, Ref. JL36200P.EPP, 4 pages, Nov. 12, 2009.

*United States Patent and Trademark Office, Office Action* for U.S. Appl. No. 10/824,873, filed Apr. 15, 2004, Inventor Shannon V. Davidson., (13 pgs), Notification Date Jan. 14, 2010.
*USPTO; Advisory Action* for U.S. Appl. No. 10/991,994, filed Nov. 17, 2004, Inventor Shannon V. Davidson; 4 pages, Notification Date Jan. 6, 2010.
*European Patent Office; Communication Pursuant to Article 94(3) EPC* for Application No. 05 732 940.1-2211, Ref. JL36196P EPP, 4 pages, Jan. 15, 2010.
*United States Patent and Trademark Office, Office Action* for U.S. Appl. No. 10/825,539, filed Apr. 15, 2004, Inventor James D. Ballew et al., (19 pgs), Notification Date Jan. 28, 2010.
*US Patent and Trademark Office, Notice of Allowance and Fee(s) Due/Notice of Allowability* for U.S. Appl. No. 10/826,959, filed Apr. 15, 2004, Inventor James D. Ballew, 6 pages, Mailing Date Dec. 17, 2009.
*Malaysia Patent Office Communication* re: Substantive Examination Adverse Report (Section 30(1)/30(2)) for Application No. PI 20051525, Filing Date Apr. 5, 2005, Ref. 7945MY4/PM/MS/WN (2 pgs), Mailed: Aug. 30, 2010.
*USPTO; Notice of Allowance and Fee(s) Due* for U.S. Appl. No. 10/824,874, filed Apr. 15, 2004 in the name of James D. Ballew; (5 pgs), Feb. 8, 2010.
*Official Letter* received Apr. 15, 2010 re: R.O.C. (Taiwanese) Application No. 94111492, notifying of contents of forthcoming second (final) Office Action and indicating opportunity to respond, and Search Report of the EP corresponding application (EP 1566738 A3); (7 pgs), Saint Island Int'l letter dated May 13, 2010.
*USPTO; Advisory Action* for U.S. Appl. No. 10/824,873, filed Apr. 15, 2004, Inventor Shannon V. Davidson; (3 pgs), Notification Date Mar. 30, 2010.
*USPTO; Notice of Allowance and Fee(s) Due* for U.S. Appl. No. 10/825,021, filed Apr. 15, 2004 in the name of Shannon V. Davidson; (12 pgs), Notification Date Apr. 30, 2010.
*USPTO; Advisory Action* for U.S. Appl. No. 10/825,539, filed Apr. 15, 2004, in the name of James D. Ballew; (4 pgs.), Notification Date May 25, 2010.
*USPTO; Office Action* for U.S. Appl. No. 10/991,994, filed Nov. 17, 2004, Inventor Shannon V. Davidson; (11 pgs), Notification Date Aug. 4, 2010.
*USPTO; Office Action* for U.S. Appl. No. 10/825,539, filed Apr. 15, 2004, Inventor James D. Ballew et al.; (21 pgs), Notification Date Aug. 9, 2010.
*USPTO; Notice of Allowance and Fee(s) Due* for U.S. Appl. No. 10/824,874, filed Apr. 15, 2004 in the name of James D. Ballew; (10 pgs) Mailed: Sep. 20, 2010.
*Japanese Patent Office Communication*, Japanese Office Action and Translation of an Office Action for Application No. 2007-508456, dated Aug. 4, 2010, (6 pg), Mailed: Aug. 10, 2010.
*Israel Patent Office Communication* Re: Brief Translation of the Office Action, Re: Notice of Deficiencies in Patent appl. No. 178608 (4 pgs), Mailed: Sep. 20, 2010.
*Israel Patent Office Communication* Re: Brief Translation of the Office Action, Re: Notice of Deficiencies in Patent appl. No. 178610 (4 pgs), Mailed: Sep. 20, 2010.
*Israel Patent Office Communication* Re: Hebrew version and brief English Translation of Office Action, ref: Patent appl. No. 179827 (3 pgs), Mailed: Oct. 10, 2010.
*Japanese Patent Office Communication*, Japanese Office Action and Translation of an Office Action for Application No. 2007-508457, JBBL/P0631, dated Sep. 29, 2010, Mailed: Oct. 12, 2010.
*European Patent Office* Communication Re: Decision to Refuse a European Patent Application, No. 05 252 239.8-1243, at the oral proceedings dated Mar. 11, 2010, Ref. JL 5105, and minutes in accordance with Rule 124(4) EPC (63 pgs), Mailed: Dec. 2, 2010.
*Israel Patent Office Communication* Re: Hebrew version and brief English Translation of Office Action, ref: Patent appl. No. 178606 (3 pgs), Mailed: Sep. 19, 2010.
*Japanese Patent Office Communication*, Japanese OA and English Translation for Appl No. 2005-117404, Appeal No. 2009-14314, drafted Nov. 30, 2010, (6 pgs), Mailed: Dec. 7, 2010.
*Perbadanan Harat Intelek Malaysia; Malaysia Patent Office Communication* re: Substantive Examination Adverse Report (Section 30(1)/30(2)) for Appl. No. PI 20051526, filed Apr. 5, 2005, Ref. 7945MY2/PM/MS/AR (3 pgs), Mailed: Jan. 31, 2011.
*USPTO; Final Office Action* for U.S. Appl. No. 10/991,994 filed Nov. 17, 2004 Inventor Shannon V. Davidson; 14 pages, Notification Date Jan. 19, 2011.
*European Patent Office* Communication Re: Summons to attend oral proceedings pursuant to Rule 115(1) EPC; Appl. No. 05 732 940.1-2211, dated Jan. 27, 2011/1735714, Ref. JL 36196P.EPP (7 pgs).
*Israel Patent Office Communication* Re: Brief Translation of the Office Action, Re: Notice of Deficiencies in Patent No. 178607 (4 pgs), Mailed: Sep. 13, 2010.
*European Patent Office Communication re: Summons to Attend Oral Proceedings Pursuant to Rule 115(1) EPC* for Application No. 05 252 239.8-1243 / 1580661, Ref. JL5105, (6 pgs), Jul. 27, 2010.
*USPTO; Final Office Action*, U.S. Appl. No. 10/825,021, filed Apr. 15, 2004 in the name of Shannon V. Davidson; (13 pgs), Notification Date Oct. 15, 2010.
*Korean Patent Office Communication (KIPO)* Ofice Action and English Translation re: Notice of Preliminary Rejection, Examination Results Summary, Ref. 064747.1167—Notification of Reason for Refusal; Application No. 10-2006-7023881, dated Apr. 26, 2011, (7 pgs), Apr. 26, 2011.
*European Patent Office Communication Pursuant to Article 94(3) EPC* for Application 07 007 897.7-2211, Ref. JL30003P.EPPD1; 7 pgs, Dated Feb. 22, 2011.
*USPTO Final Office Action* for U.S. Appl. No. 10/825,539 filed Apr. 15, 2004 Inventor James D. Ballew et al.; (22 pgs), Notification Date Mar. 17, 2011.
*Canadian Intellectual Property Office; Office Action* for Application No. 2,503,773; file No. 59259; (2 pgs), Aug. 9, 2011.
Translation of an Office Action of Japanese Patent Office, Application No. 2005/117402, 6 pages, mailed Jan. 15, 2008.
Masaaki et al., Abstract of JP8227356, 1 page, Published Sep. 3, 1996.
USPTO; Notice of Allowance and Fee(s) Due for U.S. Appl. No. 10/824,874, filed Apr. 15, 2004, Inventor James D. Ballew; (5 pgs), mailed May 5, 2011.
USPTO; non-final Office Action, U.S. Appl. No. 10/825,021, filed Apr. 15, 2004, Inventor Shannon V. Davidson; (10 pgs), Notification Date May 25, 2011.
USPTO; non final Office Action, U.S. Appl. No. 12/246,783, filed Oct. 7, 2008, Inventor Anthony N. Richoux; (26 pgs), Notification Date May 11, 2011.
Jonsson et al., *"Comparative Performance of InfiniBand Architecture and Gigabit Ethernet Interconnects on Intel® Itanium® 2 Microarchitecture-based Clusters"*, May 2003, 4th European LS-DYNA Users Conference, (10 pgs), May 2003.
Cukier, M. et al.; *"AQuA: an adaptive architecture that provides dependable distributed objects"*; 1998 Reliable Distributed Systems. Proceedings. Seventeenth IEEE Symposium on West Lafayette, USA Oct. 20, 1998, pp. 245-253, XP010319083, DOI: D0I:10.1109/RELDIS. 1998.740506 ISBN: 978-0-8186-9218, 1998.
European Patent Office, Munich Germany, Communication re: Summons to attend oral proceedings pursuant to Rule 115(1) EPC, for Application No. 05 742 298.2-2224, Ref. JL 36198P.EPP, (7 pgs), May 13, 2011.
Canadian Intellectual Property Office; Office Action for Application No. 2,503,781; file No. 59261; (2 pgs), Jun. 6, 2011.
European Patent Office Communication, Munich Germany Communication re: Minutes of oral proceedings in accordance to Rule 124(4) EPC, for Application No. 05 732 940.1-2211, Ref. JL36196P.EPP, (14 pgs), Jul. 13, 2011.
European Patent Office Communication, Netherlands Communication re: Summons to attend oral proceedings in accordance to Rule 115(1) EPC, for Application No. 05 737 440.7-1244/1735949, from foreign 064747.1190 (7 pgs), Aug. 4, 2011.
Korean Patent Office Communication, OA and English Translation re: Notice of Preliminary Rejection; KIPO Examination Results Summary, Ref: Detailed Grounds for Rejection for Appl. No. 10-2007-7013503, (6 pgs), Jul. 18, 2011.

Korean Patent Office Communication, Korean OA and Translation for Appl. No. 10-2006-7021323, dated Jul. 14, 2011, KIPO Examination Results Summary Ref: Detailed Grounds for Rejection (8 pgs), Jul. 14, 2011.

Japanese Patent Office Communication, Japanese OA and English Translation for Appl No. 2007-508520, Ref: JBBL/P0632, dated Jun. 17, 2011; (6 pgs), Jun. 28, 2011.

Masashi Shiraishi et al.; *Parallel Job Execution Tool: ParaJET*; Institute of Electronics, Information and Communication Engineers, Technical Report of IEICE, CPSY95-60 (Aug. 1996), Mitsubishi Electric Corp., IT R&D Center; (9 pgs), 1997.

USPTO; Office Action for U.S. Appl. No. 10/991,994 filed Nov. 17, 2004 Inventor Shannon V. Davidson; (15 pgs), Aug. 19, 2011.

USPTO; Notice of Allowance and Fee(s) Due for U.S. Appl. No. 10/824,874, filed Apr. 15, 2004, in the name of James D. Ballew; (7 pgs.), Aug. 22, 2011.

Korean Patent Office Communication, OA and English Translation, Examination Results Summary re: KIPO's Notice of Preliminary Rejection (English Translation) for Application 10-2006-7023882; (4 pgs.), Jul. 18, 2011.

European Patent Office Communication, Netherlands Communication re: Summons to attend oral proceedings in accordance to Rule 115(1) EPC, for Application No. 05 252 240.6-1243/1662388, (8 pgs), Aug. 5, 2011.

European Patent Office, Netherlands, Communication pursuant to Article 94(3) EPC Office Action for Application No. 05 252 237.2-1243/JL5127 (6 pgs), Aug. 2, 2011.

Japanese Patent Office Communication, Japanese Office Action and Translation of Office Action for Application No. 2007-508456, dated Jul. 26, 2011, (11 pgs), Mailed Aug. 2, 2011.

Japanese Patent Office Communication, Japanese Office Action and Translation of Office Action for Application No. 2005-117404, dated Aug. 26, 2011, (41 pgs), Mailed Aug. 30, 2011.

USPTO; Office Action for Application No. 10/825,021, filed Apr. 15, 2004 in the name of Shannon V. Davidson; 10 pgs, Notification Date Nov. 10, 2011.

European Patent Office—Munich, Germany Communication re: Examining Div., oral proceedings of Sep. 22, 2011, Decision to refuse EU patent appl., Appl. 05 742 298.2-2224/1735708, Ref. JL 36198P.EPP; Nov. 2, 2011.

USPTO; Notice of Allowance, Supplemental Notice; U.S. Appl. No. 12/246,783, filed Oct. 7, 2008 in the name of Anthony N. Richoux; 11 pgs, Notification Date Sep. 29, 2011 and Oct. 17, 2011.

USPTO; Office Action for Application No. 10/824,873, filed Apr. 15, 2004 in the name of Shannon V. Davidson; 14 pgs, Notification Date Nov. 18, 2011.

\* cited by examiner

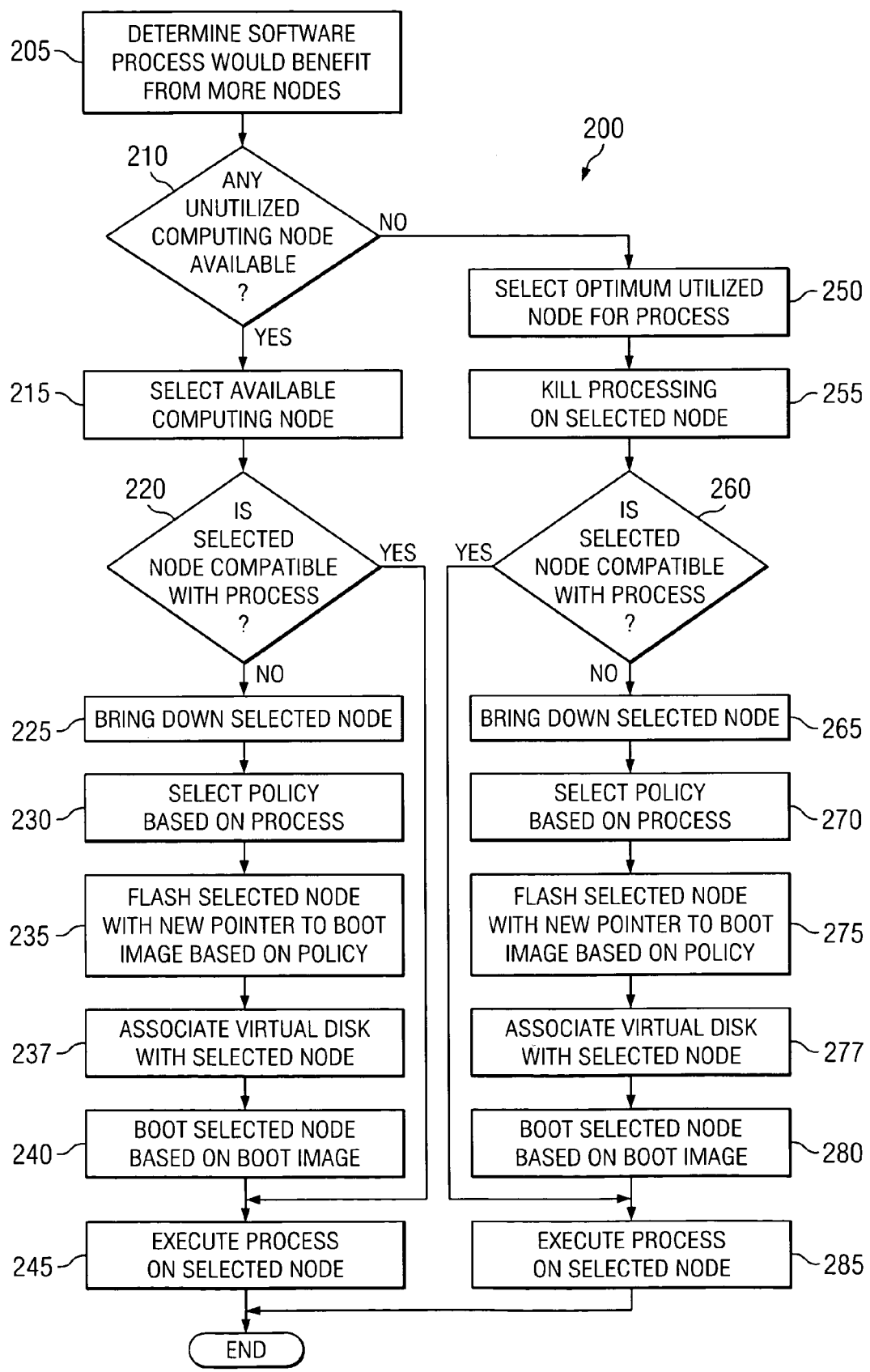

SYSTEM AND METHOD FOR COMPUTER CLUSTER VIRTUALIZATION USING DYNAMIC BOOT IMAGES AND VIRTUAL DISK

TECHNICAL FIELD

This disclosure relates generally to the field of data processing and, more specifically, to a system and method from computer cluster virtualization using dynamic boot images and virtualized disk access.

BACKGROUND OF THE INVENTION

Typically, enterprise applications are executed on dedicated compute resources. Often, an enterprise will include a variety of computing environments for different instances of the application such as production, test, and development. These multiple computing environments are typically the same size and capacity as the live or production instance. Moreover, the non-production environments are frequently idle for extended periods of time. This normally results in large amounts of wasted computing resources and labor expense in maintaining and administering these various environments.

Currently, enterprises may use provisioning as an attempt to address these issues. Generally, provisioning is the process of instantiating compute resources to the enterprise application by copying the local disk from a repository to the resource. The resource is then booted with the provisioned operating system and software through a process that normally takes over ten minutes.

SUMMARY OF THE INVENTION

This disclosure provides a system and method for computer cluster virtualization that includes selecting a distributed application. A policy associated with the distributed application is retrieved. One of a plurality of nodes is dynamically selected, possibly based on the policy. Then, a boot image of the selected node is reset based, at least in part, on the retrieved policy, with the boot image being compatible with the distributed application. Then, a virtual disk image is associated with the node. At least a portion of the distributed application is then executed on the reset node using the associated virtual disk image.

One possible advantage of particular embodiments is allowing for computing nodes to be reprovisioned on-the-fly to become a member of a virtual cluster for a distributed application, thereby possibly reducing provisioning times to fifteen seconds or less. Another possible advantage of particular embodiments may be a reduction in Information Technology (IT) hardware and maintenance costs by at least thirty percent. Moreover, when an application is not at a peak processing period, idles nodes of that application may be dynamically reallocated or reprovisioned to other distributed applications. Yet another possible advantage of particular embodiments is providing centralized capacity planning, performance monitoring, and simplified administration. Further, particular embodiments may allow for better node failure management. Various embodiments of the invention may have none, some, or all of these advantages. Other technical advantages of particular embodiments may be apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 2 illustrates an example method for dynamically rebooting a node within one embodiment of the present disclosure.

DETAILED DESCRIPTION OF THE DRAWINGS

Figure 1:
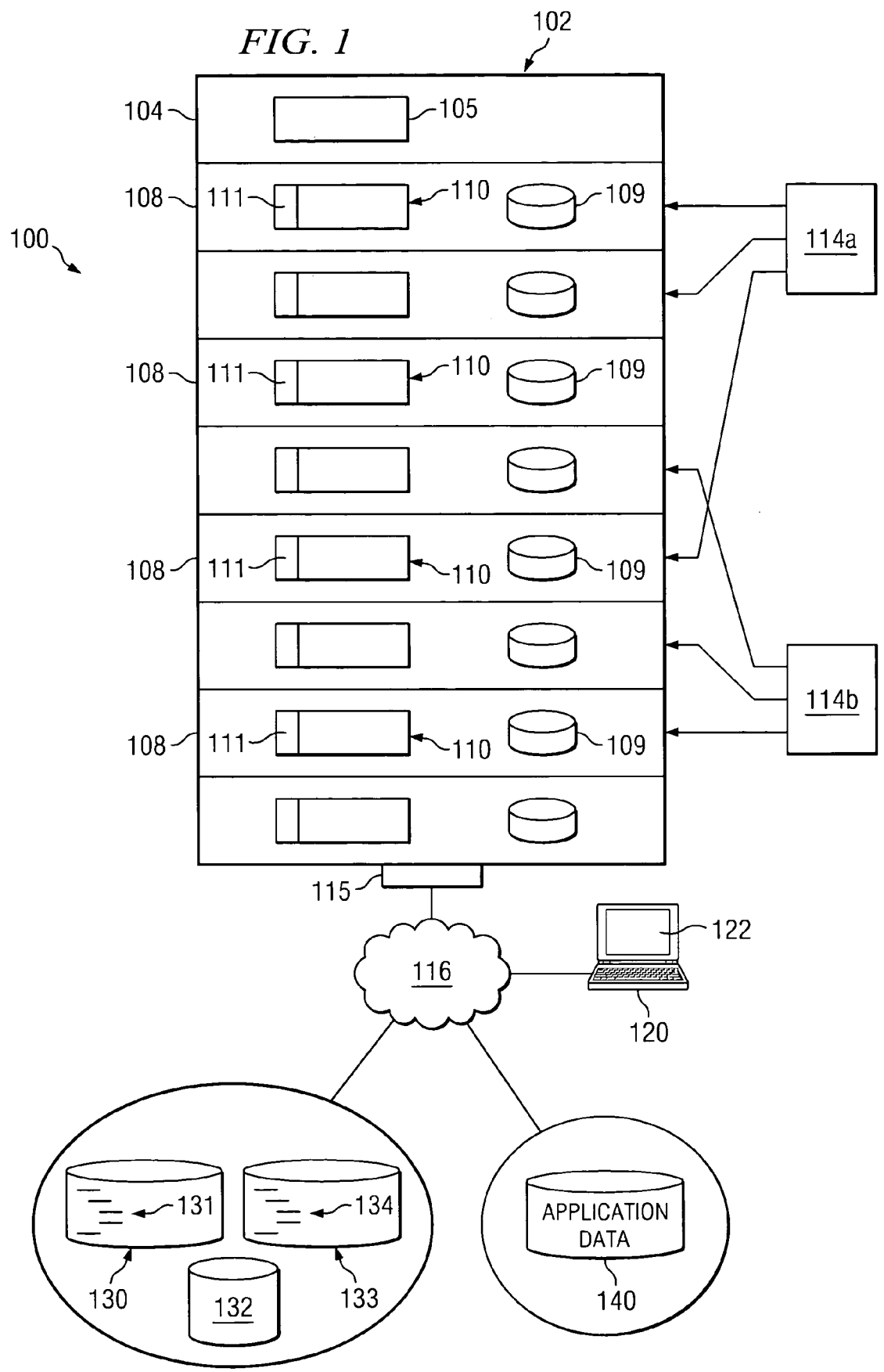
FIG. 1 illustrates an example distributed system providing dynamic booting in accordance with one embodiment of the present disclosure.

FIG. 1 is a block diagram illustrating a distributed computing system 100 for executing software applications 114 and processes using dynamic boot images 131. Generally, system 100 is a scalable distributed computing environment for enterprise or other distributed applications. System 100 provides a scalable, fault-tolerant computing environment, which can dynamically grow based on computing needs and can simultaneously provide computing resources to multiple applications 114 through providing each application 114 with its own scalable virtual cluster. For example, system 100 may include server 102 that is connected, through network 116 to one or more administration workstations or local clients 120. But system 100 may alternatively be a standalone computing environment or any other suitable environment. In short, system 100 is any computing environment that automatically allows nodes 108 to be dynamically allocated on-the-fly as application 114 requirements, parameters, and processing needs change. The term "dynamically," as used herein, generally means that certain processing is determined, at least in part, at run-time based on one or more variables. The term "automatically," as used herein, generally means that the appropriate processing is substantially performed by at least part of system 100. It should be understood that "automatically" further contemplates any suitable user or administrator interaction with system 100 without departing from the scope of this disclosure.

Server 102 comprises any local or distributed computer operable to execute a plurality of applications 114 across one or nodes 108. Generally, server 102 comprises a distributed computer such as a rack-mounted server, blade server, or other distributed server. Nodes 108 comprise any computer or processing device such as, for example, blades, general-purpose personal computers (PC), Macintoshes, workstations, Unix-based computers, or any other suitable devices. Generally, FIG. 1 provides merely one example of computers or blades that may be used with the disclosure. For example, although FIG. 1 illustrates one blade server 102 that may be used with the disclosure, server 102 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. Server 102, or the component nodes 108, may be adapted to execute any operating system including Linux, UNIX, Windows Server, or any other suitable operating system. According to one embodiment, server 102 may also include or be communicably coupled with a remote web server.

Illustrated server 102 includes a management node 104 communicably coupled with a plurality of nodes 108 and operable to execute dynamic boot engine 105. But it will be understood that server 102 and nodes 108 may not include all of the illustrated components. Management node 104 comprises at least one blade or computing device substantially dedicated to managing server 102 or assisting an administrator. For example, management node 104 may comprise two hot-swappable blades, with one of the two blades or rack-mounted servers being redundant (such as an active/passive configuration).

Dynamic boot engine 105 could include any hardware, software, firmware, or combination thereof operable to dynamically allocate and manage nodes 108 and execute applications 114 using virtual clusters of nodes 108 (or application environments). For example, dynamic boot engine 105 may be written or described in any appropriate computer language including C, C++, Java, Visual Basic, assembler, any suitable version of 4GL, and others or any combination thereof. It will be understood that while dynamic boot engine 105 is illustrated in FIG. 1 as a single multi-tasked module, the features and functionality performed by this engine may be performed by multiple modules such as, for example, a physical layer module, a virtual layer module, a job scheduler, and a presentation engine. Moreover, dynamic boot engine 105 may be a child or sub-module of another software module without departing from the scope of this disclosure. Therefore, dynamic boot engine 105 comprises one or more software modules operable to intelligently manage nodes 108 and applications 114 based on policies 132.

Generally, dynamic boot engine 105 manages one or more applications 114 by starting and stopping application environments on the individual nodes 108. For example, dynamic boot engine 105 may reset the particular node 108 with a different boot image 131 from boot image file 130, which is specific to or compatible with the desired application environment. In other words, dynamic boot engine 105 supports dynamically booting any suitable application environment on any controlled node 108. Accordingly, dynamic boot engine 105 may also support dynamically setting IP or MAC addresses for the public IP interface on any controlled computer. Dynamic boot engine 105 may also boot any node 108 directly from the network using a network boot protocol or by booting from attached disk storage. Dynamic boot engine 105 may also utilize high speed network access to a virtual local disk image containing the operating system, services, and applications for any controlled computer. It will be understood that dynamic boot engine 105 may start up or shut down application environments based on calendar date and times or using any other predetermined parameter.

Dynamic boot engine 105 may also support various fault tolerance and recovery techniques. For example, boot engine 105 may automatically recover server 102 from single hardware component failures by automatically replacing and dynamically rebooting a replacement node 108 for the failed node 108. Moreover, installing a new node 108 may be facilitated because of dynamic boot engine's 105 ability to automatically recognize the new node 108 and do any required configuration, resetting, or booting.

Nodes 108 comprises any computer, blade, or server operable to execute at least a portion (such as a task or process) of application 114. Illustrated node 108 includes, at a high level, memory 109 and processor 110. Memory 109 may include any memory or database module and may take the form of volatile or non-volatile memory including, without limitation, magnetic media, optical media, random access memory (RAM), read-only memory (ROM), removable media, or any other suitable local or remote memory component. Memory 109 may include any of a variety of local information. Node 108 also includes processor 110. Processor 110 executes instructions and manipulates data to perform the operations of server 102 such as, for example, a central processing unit (CPU) or field programmable gate array (FPGA). Although FIG. 1 illustrates a single processor 110 in each node 108, multiple processors 110 may be used according to particular needs and reference to processor 110 is meant to include multiple processors 110 where applicable. Processor 110 may include any pointer to a boot image such as, for example, Electronically Erasable Programmable Read-Only Memory (EEPROM) 111. But it will be understood that node 108 may comprise any number of components, configured in any appropriate fashion, without departing from the scope of this disclosure. Node 108 may also include one or more local hard drives for the purposes of providing local temporary file space and virtual memory swap space.

Application 114 may comprise any enterprise or distributed application such as, for example, a database management system (DBMS), financial software, and others. Typically, application 114 is comprised of software written in any suitable language and operable to perform any data processing. But unconventional applications are also within the scope of this disclosure. Applications 114 may run in an application environment, or virtual cluster, which logically defines the environment for application execution. In one embodiment, an application environment comprises i) name and description of the application environment; ii) minimum/maximum number of nodes 108; iii) software configuration information, such as operating system software version and application 114 software version; and iv) hardware configuration of each node 108 such as boot image, hostname and IP address, custom configuration applied after node 108 booting, virtual local disk image, local file systems, file systems to mount, and network configuration. But it will be understood that any suitable parameter, variable, or characteristic may be used to assist dynamic boot engine 105 with defining, locating, and processing the application environment. For example, the application environment may also include information on application 114 startup, shutdown, and health monitoring.

Server 102 may include interface 115 for communicating with other computer systems, such as client 120, over network 116 in a client-server or other distributed environment. In certain embodiments, server 102 receives boot images 131, virtual local disk images 134, policies 132, or application data 140 from network 116 for storage or processing via high-speed interface 115. Generally, interface 115 comprises logic encoded in software and/or hardware in a suitable combination and operable to communicate with network 116. More specifically, interface 115 may comprise software supporting one or more communications protocols associated with communications network 116 or hardware operable to communicate physical signals.

Network 116 facilitates wireless or wireline communication between computer server 102 and any other computer, such as clients 120. Indeed, while illustrated as residing between server 102 and client 120, network 116 may also reside between various nodes 108 without departing from the scope of the disclosure. In other words, network 116 encompasses any network, networks, or sub-network operable to facilitate communications between various computing components. Network 116 may communicate, for example, Internet Protocol (IP) packets, Frame Relay frames, Asynchronous Transfer Mode (ATM) cells, voice, video, data, and other suitable information between network addresses. Network 116 may also process and route data packets according to any other suitable communication protocol, for example, InfiniBand (IB), Gigabit Ethernet (GE), or FibreChannel (FC). Data packets are typically used to transport data within application data 140. A data packet may include a header that has a source identifier and a destination identifier. The source identifier, for example, a source address, identifies the transmitter of information, and the destination identifier, for example, a destination address, identifies the recipient of the information. Network 116 may include one or more local area networks (LANs), radio access networks (RANs), metropolitan area networks (MANs), wide area networks (WANs), all or a portion of the global computer network known as the Internet, and/or any other communication system or systems at one or more locations.

Boot table 130 is any disk farm or network file system that includes a plurality of boot images 131. While illustrated as remote, boot images 131 may be preloaded by dynamic boot engine 105 to simplify initialization and installation. Boot image 131 is any form, image, pointer, or reference to at least a portion of the boot drive primary operating system partition. Boot image 131 is typically in binary form. Boot image types include kernel images from a file, kernel images from a block device or floppy disk, or the boot sector of some operating system. For example, a Linux boot image might appear as:

0x1B031336,
0x4,
0x90000000,
0x90000200,
0x4,
0x90200,
0x800,
0x800,
0x4,
0x10000,
0x80000,
0x80000,
0x04000004,
0x100000,
0x80000,
0x80000

It will be understood that above example boot image 131 is for illustration purposes only and may include none, some, or all of the illustrated elements as well as additional elements not shown. Moreover, boot image 131 may be in a different layout or format than the above example without departing from the scope of this disclosure.

Policies table 132 includes any parameters for managing nodes 108 and applications 114. For example, policies 132 may be for automatically adding or subtracting nodes 108 to application environments. Alternatively or in combination, policies 132 may be used by server 102 to resolve issues between competing applications 114. Generally, policies table 132 may comprise one or more tables stored in a relational database described in terms of SQL statements or scripts. In another embodiment, policies table 132 may store or define various data structures as XML documents, Virtual Storage Access Method (VSAM) files, flat files, Btrieve files, or comma-separated-value (CSV) files. Policies table 132 may also comprise a plurality of tables or files stored on one computer or across a plurality of computers. Moreover, policies table 132 may be local or remote without departing from the scope of this disclosure and store any type of appropriate data. For example, policies table 132 may store individual virtual cluster policies including: i) minimum/maximum number of nodes 108 assigned to an application environment; ii) default number of servers assigned to the application; iii) conditions to dynamically add node 108 to the application environment; iv) conditions to dynamically remove node 108 from the application environment; v) conditions to remove node 108 (such as turning off network access), but leave it up for problem investigation; and vi) conditions under which node 108 should not be removed because application 114 is actively running a transaction or process.

In another example, policies table 132 may include any number of inter-virtual cluster policies such as priority, resource sharing, and preemption policies. Priority typically determines which application environment gets the resources if there is a policy conflict. For example, if the priority of a particular application environment is higher, it may get prioritized access to nodes 108. Resource sharing is often based on defined entitlement of the application environments. For example, each application environment may be granted an entitlement to a percentage of nodes 108. Resource sharing may also be based on computer usage over a sliding window of time. Preemption policies may allow high priority application environments to take over nodes 108 from lower priority application environments.

Virtual local disk image table 133 is any disk farm or network file system that includes a plurality of virtual local disk images 134. While illustrated as remote, virtual local disk image 134 may be preloaded with the operating system and application software to simplify initialization and installation. Virtual local disk image 134 is any form, image, pointer, or reference to the local disk storage of each virtual node for each application. Virtual local disk image 134 will typically include the operating system, configured services, and installed applications of each application's virtual node. Each virtual local disk image 134 may contain multiple file systems, which may be read-only for sharing between multiple nodes, or modifiable file systems, which are normally specific to an application node. Virtual local disk image 134 may be stored in a hierarchical directory within a traditional file system or may be stored in a recoverable database with a network file system interface provided to the application nodes.

In general, application data 140 is any memory, database, storage area network (SAN), or network-attached storage (NAS) for storing data for applications 114. Application data 140 may comprise one or more tables stored in a relational database described in terms of SQL statements or scripts. In another embodiment, application data 140 may store or define various data structures as XML documents, VSAM files, flat files, Btrieve files, or CSV files. Application data 140 may also comprise a plurality of tables or files stored on one computer or across a plurality of computers. Moreover, application data 140 may be local or remote without departing from the scope of this disclosure.

Client 120 is any device operable to present the user with an administration screen via a graphical user interface (GUI) 122. At a high level, illustrated client 120 includes at least GUI 122 and comprises an electronic computing device operable to receive, transmit, process and store any appropriate data associated with system 100. It will be understood that there may be any number of clients 120 communicably coupled to server 102. Further, "client 120" and "user of client 120" may be used interchangeably as appropriate without departing from the scope of this disclosure. Moreover, for ease of illustration, each client is described in terms of being used by one user. But this disclosure contemplates that many users may use one computer to communicate commands or view graphical presentations using the same GUI 122.

As used in this disclosure, client 120 is intended to encompass a personal computer, touch screen terminal, workstation, network computer, kiosk, wireless data port, cell phone, personal data assistant (PDA), one or more processors within these or other devices, or any other suitable processing device. For example, client 120 may comprise a computer that includes an input device, such as a keypad, touch screen, mouse, or other device that can accept information, and an output device that conveys information associated with the operation of server 102 or clients 120, including digital data, visual information, or GUI 122. Both the input device and output device may include fixed or removable storage media such as a magnetic computer disk, CD-ROM, or other suitable media to both receive input from and provide output to users of clients 120 through the administration and job submission display, namely GUI 122.

GUI 122 comprises a graphical user interface operable to allow the system (or network) administrator to interface with system 100 to monitor applications 114 or system performance, modify virtual clusters, or any suitable supervisory purpose. Generally, GUI 122 provides the user of client 120 with an efficient and user-friendly presentation of data provided by system 100. GUI 122 may comprise a plurality of customizable frames or views having interactive fields, pull-down lists, and buttons operated by the user. In one embodiment, GUI 122 presents display that presents the various graphical views of application environments or policy screens and receives commands from the user of client 120 via one of the input devices. These graphical views may include i) graphical representations of the current status of application environments, nodal resources, and monitored loads; ii) graphical representations of application environment and nodal loads and usage over time; iii) wizards; and iv) views of which application 114 is running in each application environment and on each node 108. In short, GUI 122 may present any physical and logical status or characteristics of nodes 108 to the system administrator and receive various commands from the administrator.

In one embodiment, GUI 122 may allow an administrator to create, delete, copy, and modify application environments. The administrator may also set up application environment sharing policies, activate and deactivate application environments, monitor states and loads of application environments and nodes 108 using GUI 122. Further, GUI 122 may allow the adding or subtracting of nodes 108 from active application environments. GUI 122 may also present alerts to an administrator based on various system 100 characteristics such as, for example, configurable load levels were reached on node 108 or within an application environment, a node 108 became unavailable, application environment started or stopped, node 108 was added or subtracted from application environment, server 102 was unable to meet minimum application environment requirements, or a level of service requirement (such as transaction response time) was exceeded.

It should be understood that the term graphical user interface may be used in the singular or in the plural to describe one or more graphical user interfaces and each of the displays of a particular graphical user interface. Therefore, GUI 122 contemplates any graphical user interface, such as a generic web browser, that processes information in system 100 and efficiently presents the results to the user. GUI 122 also contemplates a secured browser operable to communicate via SSL-HTTPS. Server 102 can accept data from client 120 via the web browser (e.g., Microsoft Internet Explorer or Netscape Navigator) and return the appropriate HTML or XML responses using network 116.

In one aspect of operation, dynamic boot engine 105 selects a distributed application 114. Based on one or more associated policies 132, dynamic boot engine 105 may dynamically add or subtract one or more selected nodes 108 to the particular application environment or virtual cluster. Based on the retrieved policies 132, dynamic boot engine 105 selects the appropriate boot image 132 for the selected nodes 108. For example, if there are already four nodes 108 executing a portion of application 114, then dynamic boot engine 105 automatically selects the fifth boot image 132 (at least partially based on node's 108 hardware and other characteristics and the one or more policies 132) that is compatible with application 114. Based on the retrieved policies 132, dynamic boot engine 105 may also select the appropriate virtual local disk image 134 for the selected nodes 108. Once the appropriate boot image 132 and/or virtual local disk image 134 are selected, dynamic boot engine 105 flashes node 108 with a pointer or other reference to the selected boot image 132 and virtual local disk image 134 and reboots node 108. Once node 108 is initialized (normally less than fifteen seconds), dynamic boot engine 105 (or some other job scheduler) executes the appropriate task, process, or other portion of application 104 on the selected node 108.

FIG. 2 is a flowchart illustrating an example method 200 for dynamically rebooting a node 108 within one embodiment of the present disclosure. FIG. 2 illustrates method 200, which generally describes a dynamic allocation of one of a plurality of nodes 108 to a virtual cluster or application environment. Of course, any number of nodes 108 may be sequentially or concurrently reset, rebooted, or otherwise allocated within the scope of this disclosure. At a high level, method 200 includes selecting node 108 for allocation to an application's 114 environment, resetting boot image 132 of the selected node 108, and rebooting the node 108. The following description focuses on the operation of dynamic boot engine 105 in performing method 200. But system 100 contemplates using any appropriate combination and arrangement of logical elements implementing some or all of the described functionality.

Method 200 begins at step 205, where dynamic boot engine 105 determines that software application 114 should be allocated more nodes 108. This determination may occur using any appropriate technique. For example, the administrator may manually add node 108 to the application environment for application 114. In another example, dynamic boot engine 105 may dynamically determine that nodes 108 may or should be used based on policies 132. Next, at step 210, dynamic boot engine 105 determines if there are any unutilized computing nodes 108 available. If there are more nodes 108 available, then dynamic boot engine 105 selects first available computing node 108 using any suitable technique at step 215. For example, dynamic boot engine 105 may select node 108 based on physical location, virtual location, application 114 compatibility, processor speed, or any other suitable characteristic. At decisional step 220, dynamic boot engine 105 determines if the selected node is compatible with application 114. If node 108 is not compatible with application 114, then dynamic boot engine 105 brings down the selected node using any suitable technique at step 225. Next, dynamic boot engine 105 dynamically selects policy 132 based on the software application 114 at step 230. For example, dynamic boot engine 105 may determine that three nodes 108 are currently executing software application 114. Based on this determination, dynamic boot engine 105 locates the fourth logical node 108 in policy 132. Based on the selected policy 132, dynamic boot engine 105 flashes the selected node with a pointer to a new boot image 131 at step 235 and associates virtual local disk image 134 at step 237. As described above, dynamic boot engine 105 may flash EEPROM 111 or any other suitable component. Next, dynamic boot engine 105 boots the selected node 108 using the new boot image 131 at step 240. Once the node 108 has been rebooted (or if the node was already compatible with application 114), then dynamic boot engine 105 executes application 114 on the selected node 108 at step 245 and method 200 ends.

Returning to decisional step 210, if there were no computing nodes 108 available, then dynamic boot engine 105 selects an optimum utilized node 108 for application 114 at step 250. This selection of optimum node 108 may occur in any appropriate fashion such as, for example, determining the least utilized node 108, selecting a compatible node 108, or determining some other "best fit". At step 255, dynamic boot engine 105 kills the current processing on selected node 108 at step 255. Dynamic boot engine 105 may terminate the processing using any suitable technique such as executing an application-specific command, killing a process using the operating system, and others. At decisional step 260, dynamic boot engine 105 determines if the selected node 108 is compatible with application 114. If node 108 is not compatible with application 114, then dynamic boot engine 105 brings down the selected node using any suitable technique at step 265. Next, dynamic boot engine 105 dynamically selects policy 132 based on the software application 114 at step 270. For example, dynamic boot engine 105 may determine that three nodes 108 are currently executing software application 114. Based on this determination, dynamic boot engine 105 locates the fourth logical node 108 in policy 132. Based on the selected policy 132, dynamic boot engine 105 flashes the selected node with a pointer to a new boot image 131 at step 275 and associates virtual local disk image 134 at step 277. As described above, resource management engine may flash EEPROM 111 or any other suitable component. Next, dynamic boot engine 105 boots the selected node 108 using the new boot image 131 and virtual local disk image 134 at step 280. Once the node 108 has been rebooted (or if the node was already compatible with application 114), then dynamic boot engine 105 executes application 114 on the selected node 108 at step 285 and method 200 ends.

The preceding flowchart and accompanying description illustrate only exemplary method 200. System 100 contemplates using any suitable technique for performing these and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   selecting a distributed application;
   retrieving a policy associated with the distributed application;
   dynamically selecting one of a plurality of nodes;
   resetting a boot image of the selected node based at least in part on the retrieved policy, wherein the boot image being compatible with the distributed application, wherein resetting the boot image of the selected node comprises: automatically shutting down the selected node; resetting the boot image of the selected node; and restarting the selected node using the reset boot image;
   associating a virtual disk image with the selected node based at least in part on the retrieved policy; and
   executing at least a portion of the distributed application on the selected node, as reset, using the virtual disk image associated with the selected node, the execution performed by at least one processor of the selected node.

2. The method of claim 1, wherein:
   the distributed application is operable to execute at a subset of the plurality of nodes; and
   the method further comprises:
      comparing the subset of nodes with the retrieved policy; and
      selecting one of a plurality of compatible boot images based on the comparison.

3. The method of claim 2, wherein comparing the subset of nodes with the retrieved policy comprises:
   determining a count of nodes in the subset; and
   selecting the boot image based on a link in the policy and the count of nodes.

4. The method of claim 2, wherein each node in the subset corresponds to one of the plurality of compatible boot images.

5. The method of claim 1, wherein dynamically selecting one of the plurality of nodes comprises:
   determining if one or more of the plurality of nodes is unutilized by another distributed application; and
   in response to at least one of the nodes being unutilized, selecting one of the unutilized nodes.

6. The method of claim 5, further comprising, in response to none of the nodes being unutilized, selecting one of the nodes utilized by the other distributed application based on one or more of the following:
   the retrieved policy;
   low utilization of the selected node;
   priority of the selected distributed application; or
   compatibility of the selected node with the selected distributed application.

7. The method of claim 1 further comprising terminating any processes associated with the second distributed application prior to shutting down the selected node.

8. The method of claim 1, wherein the policy comprises a plurality of links to boot images, each link corresponding to one of a count of nodes compatible with the distributed application.

9. The method of claim 1, wherein the policy comprises one or more parameters for determining timing of the selection of the node.

10. The method of claim 1, wherein the boot image comprises a remote boot image stored in a Storage Area Network (SAN).

11. The method of claim 1, wherein the selected node corresponds to a first boot image prior to the reset and a second boot image from the reset, the first and second boot images differing from each other with respect to one or more of the following characteristics:
    operating system;
    system configuration; or
    distributed application parameters.

12. The method of claim 1, wherein:
    the method further comprises determining that one of the plurality of nodes has failed, the failed node having executed at least a portion of the selected distributed application; and
    selecting one of the plurality of nodes comprises selecting one of the remaining nodes in response to the failure.

13. The method of claim 1, wherein each of the plurality of nodes comprises a same processor architecture.

14. The method of claim 1, wherein selecting one of the plurality of nodes comprises selecting one of the plurality of nodes at a predetermined time.

15. One or more non-transitory computer readable media embodying software that, when executed by a processor, operates to: select a distributed application; retrieve a policy associated with the distributed application; dynamically select one of a plurality of nodes;

reset a boot image of the selected node based at least in part on the retrieved policy, wherein the boot image being compatible with the distributed application, wherein resetting the boot image of the selected node comprises: automatically shutting down the selected node; resetting the boot image of the selected node; and restarting the selected node using the reset boot image;

associate a virtual disk image with the selected node based at least in part on the retrieved policy; and execute at least a portion of the distributed application on the selected node, as reset, using the virtual disk image associated with the selected node.

16. The one or more non-transitory computer readable media of claim 15, wherein the software is further operable, when a subset of the plurality of nodes is executing the distributed application, to:

compare the subset of nodes with the retrieved policy; and select one of a plurality of compatible boot images based on the comparison.

17. The one or more non-transitory computer readable media of claim 16, wherein, to compare the subset of nodes with the retrieved policy, the software is operable to:

determine a count of nodes in the subset; and select the boot image based on a link in the policy and the count of nodes.

18. The one or more non-transitory computer readable media of claim 16, wherein each node in the subset corresponds to one of the plurality of compatible boot images.

19. The one or more non-transitory computer readable media of claim 15, wherein, to dynamically select one of the plurality of nodes, the software is operable to:

determine if one or more of the plurality of nodes is unutilized by another distributed application; and in response to at least one of the nodes being unutilized, select one of the unutilized nodes.

20. The one or more non-transitory computer readable media of claim 19, wherein, in response to none of the nodes being unutilized, the software is further operable to select one of the nodes utilized by the second distributed application based on one or more of the following:

the retrieved policy;

low utilization of the selected node;

priority of the selected distributed application; or compatibility of the selected node with the selected distributed application.

21. The one or more non-transitory computer readable media of claim 15, wherein the software is further operable to terminate any processes associated with the other distributed application prior to shutting down the selected node.

22. The one or more non-transitory computer readable media of claim 15, wherein the policy comprises a plurality of links to boot images, each link corresponding to one of a count of nodes compatible with the distributed application.

23. The one or more non-transitory computer readable media of claim 15, wherein the policy comprises one or more parameters for determining timing of the selection of the node.

24. The one or more non-transitory computer readable media of claim 15, wherein the boot image comprises a remote boot image stored in a Storage Area Network (SAN).

25. The one or more non-transitory computer readable media of claim 15, wherein the selected node corresponds to a first boot image prior to the reset and a second boot image from the reset, the first and second boot image differing from each other with respect to one or more of the following characteristics:

operating system;

system configuration; or distributed application parameters.

26. The one or more non-transitory computer readable media of claim 15, wherein:

the software is further operable to determine that one of the plurality of nodes has failed, the failed node having executed at least a portion of the selected distributed application; and to select one of the plurality of nodes, the software is operable to select one of the remaining nodes in response to the failure.

27. The one or more non-transitory computer readable media of claim 15, wherein each of the plurality of nodes comprising a same processor architecture.

28. The one or more non-transitory computer readable media of claim 15, wherein, to select one of the plurality of nodes, the software is operable to select one of the plurality of nodes at a predetermined time.

29. A system comprising: a plurality of nodes, each node comprising at least one processor; and a management node communicably coupled to the plurality of nodes, the management node operable to:

select a distributed application; retrieve a policy associated with the distributed application; dynamically select one of a plurality of nodes;

reset a boot image of the selected node based at least in part on the retrieved policy, wherein the boot image being compatible with the distributed application, wherein, to reset the boot image of the selected node, the management node is operable to: automatically shut down the selected node; reset the boot image of the selected node; and restart the selected node using the reset boot image;

associate a virtual disk image with the selected node based at least in part on the retrieved policy; and execute at least a portion of the distributed application on the selected node, as reset, using the virtual disk image associated with the selected node.

30. The system of claim 29, wherein:

the distributed application is operable to execute at a subset of the plurality of nodes; and the management node is further operable to:

compare the subset of nodes with the retrieved policy; and select one of a plurality of compatible boot images based on the comparison.

31. The system of claim 30, wherein, to compare the subset of nodes with the retrieved policy, the management node is operable to:

determine a count of nodes in the subset; and select the boot image based on a link in the policy and the count of nodes.

32. The system of claim 30, wherein each node in the subset corresponds to one of the plurality of compatible boot images.

33. The system of claim 29, wherein, to dynamically select one of the plurality of nodes, the management node is operable to:

determine if one or more of the plurality of nodes is unutilized by another distributed application; and in response to at least one of the nodes being unutilized, select one of the unutilized nodes.

34. The system of claim 33, wherein, in response to none of the nodes being unutilized, the management node is operable to select one of the nodes utilized by the other distributed application based on one or more of the following:
- the retrieved policy;
- low utilization of the selected node;
- priority of the selected distributed application; or
- compatibility of the selected node with the selected distributed application.

35. The system of claim 29, wherein the management node is further operable to terminate any processes associated with the second distributed application prior to shutting down the node.

36. The system of claim 29, wherein the policy comprises a plurality of links to boot images, each link corresponding to one of a count of nodes compatible with the distributed application.

37. The system of claim 29, wherein the policy comprises one or more parameters for determining timing of the selection of the node.

38. The system of claim 29, wherein the boot image comprises a remote boot image stored in a Storage Area Network (SAN).

39. The system of claim 29, wherein the selected node corresponds to a first boot image prior to the reset and a second boot image from the reset, the first and second boot images differing from each other with respect to one or more of the following characteristics:
- operating system;
- system configuration; or
- distributed application parameters.

40. The system of claim 29, wherein:
- the management node is further operable to determine that one of the plurality of nodes has failed, the failed node having executing at least a portion of the selected distributed application; and
- to select one of the plurality of nodes, the management node is operable to select one of the remaining nodes in response to the failure.

41. The system of claim 29, wherein each of the plurality of nodes comprises a same processor architecture.

42. The system of claim 29, wherein, to select one of the plurality of nodes, the management node is operable to select one of the plurality of nodes at a predetermined time.

* * * * *